(12) United States Patent
Suh et al.

(10) Patent No.: US 9,350,394 B2
(45) Date of Patent: May 24, 2016

(54) WIRELESS COMMUNICATION DEVICE USING TIME-VARIANT ANTENNA MODULE (75) Inventors: Seong-Youp Suh, Portland, OR (US); W. Dawson Kesling, Davis, CA (US); Majid Manteghi, Blacksburg, VA (US); Mohsen Salehi, Woodbury, MN (US); Harry G. Skinner, Beaverton, OR (US)

(73) Assignees: INTEL CORPORATION, Santa Clara, CA (US); VIRGINIA TECH INTELLECTUAL PROPERTIES, INC., Blacksburg, VA (US)

(*) Notice: Subject to any disclaimer, the term of this patent is extended or adjusted under 35 U.S.C. 154(b) by 0 days.

(21) Appl. No.: 13/996,516

(22) PCT Filed: Dec. 16, 2011

(86) PCT No.: PCT/US2011/065629
§ 371 (c)(1), (2), (4) Date: Oct. 7, 2013

(87) PCT Pub. No.: WO2013/089790
PCT Pub. Date: Jun. 20, 2013

(65) Prior Publication Data
US 2014/0018020 A1 Jan. 16, 2014

(51) Int. Cl.
*H04B 1/40* (2015.01)
*H04B 1/04* (2006.01)
*H01Q 5/335* (2015.01)
(Continued)

(52) U.S. Cl.
CPC ............... *H04B 1/04* (2013.01); *H01Q 5/335* (2015.01); *H01Q 9/145* (2013.01); *H04B 1/0458* (2013.01); *H04B 1/18* (2013.01)

(58) Field of Classification Search
CPC ........ H04B 1/40; H04B 1/3822; H04B 1/406; H04B 1/44; H04B 1/54; H04B 1/0458; H04B 1/28; H04B 1/30; H03C 7/02; H03C 1/00; H03C 3/22
USPC .......... 455/75–78, 107, 118–120, 230, 234.1, 455/255–26, 313, 323, 333, 334, 550.1
See application file for complete search history.

(56) References Cited

U.S. PATENT DOCUMENTS 6,064,868 A 5/2000 Kobayashi
7,576,657 B2 * 8/2009 Duron et al. ............... 340/572.7
2004/0009754 A1 1/2004 Smith, Jr.
(Continued)

FOREIGN PATENT DOCUMENTS

CN 1669218 A 9/2005
CN 1770642 A 5/2006
(Continued)

OTHER PUBLICATIONS

Chinese Patent Office, First Office Action for Chinese App. No. 2011800755769 dated Dec. 24, 2014; 13 pages inclusive of English translation.
(Continued)

*Primary Examiner* — Nhan Le
(74) *Attorney, Agent, or Firm* — Schwabe, Williamson & Wyatt, P.C.

(57) ABSTRACT

Embodiments of the present disclosure describe methods, apparatuses, and systems related to a wireless communication device using time-variant antenna. Other embodiments may be described and/or claimed.

19 Claims, 5 Drawing Sheets (51) Int. Cl.
*H01Q 9/14* (2006.01)
*H04B 1/18* (2006.01)

(56) References Cited

U.S. PATENT DOCUMENTS

| | | | |
|---|---|---|---|
| 2005/0184922 | A1 | 8/2005 | Ida et al. |
| 2005/0253716 | A1* | 11/2005 | Hayashi et al. ............ 340/572.1 |
| 2006/0094458 | A1 | 5/2006 | Kitaji |
| 2006/0290582 | A1 | 12/2006 | Lee |
| 2007/0035356 | A1 | 2/2007 | Ranta |
| 2011/0122921 | A1* | 5/2011 | McCorkle .................... 375/130 |
| 2011/0166629 | A1 | 7/2011 | Dion et al. |
| 2011/0244801 | A1* | 10/2011 | Utagawa et al. ............... 455/42 |
| 2011/0256841 | A1 | 10/2011 | Kakuya et al. |
| 2012/0088463 | A1 | 4/2012 | Rofougaran |
| 2014/0065982 | A1 | 3/2014 | Suh et al. |
| 2015/0171915 | A1 | 6/2015 | Suh et al. |

FOREIGN PATENT DOCUMENTS

| | | | |
|---|---|---|---|
| CN | 101039123 | A | 9/2007 |
| CN | 102204084 | A | 9/2011 |
| JP | 11-251928 | A | 9/1999 |
| JP | 2002-064402 | A | 2/2002 |
| JP | 2007-013965 | A | 1/2007 |
| JP | 2007-243506 | A | 9/2007 |
| JP | 2008-035065 | A | 2/2008 |
| JP | 2010-028318 | A | 2/2010 |
| JP | 2011-009862 | A | 1/2011 |
| WO | 2014039135 | A1 | 3/2014 |

OTHER PUBLICATIONS

M. Manteghi; A Switched-Band Antenna for Software-Defined Radio Application; IEEE Antennas and Wireless Propagation Letters; vol. 8, 2009; pp. 3-5.
M. Manteghi; Antenna Miniaturization Beyond the Fundamental Limits Using Impedance Modulation; IEEE APS; Jun. 2009; Charleston, West Virginia; pp. 1-4.
M. Manteghi: Non-LTI Systems, a New Frontier in Electromagnetics Theory; IEEE APS, Jul. 2010; Toronto, Canada; pp. 1-4.
Peregrine Semiconductor Corp.; "Product Specification PE64904 UltraCMOS© Digitally Tunable Capacitor (DTC) 100-3000 MHz"; 2011; pp. 1-11.
Peregrine Semiconductor Corp.; "Peregrine Semiconductor Unveils Digitally Tunable Capacitors Variable Capacitors Enable Frequency-Agile Tunable Networks"; Jun. 8, 2011; 2 pages; http://www.psemi.com/newsroom/press-releases/238354-peregrine-semiconductor-unveils-digitally-tunable-capacitors; website accessed Mar. 12, 2015.
International Search Report and Written Opinion mailed Sep. 28, 2012 from International Application No. PCT/US2011/065629.
International Preliminary Report on Patentability mailed Jun. 26, 2014 from International Application No. PCT/US2011/065629.
Chinese Patent Office, Second Office Action for Chinese App. No. 201180075576.9 dated May 28, 2015; 5 pages inclusive of English translation.
European Patent Office; Extended European Search Report for European App. No. 11877309.2 dated Jul. 8, 2015; 5 pages.
Japanese Patent Office; Office Action for Japanese App. No. 2014-547165 dated Jun. 16, 2015; 3 pages inclusive of English translation.
United States Patent and Trademark Office; Office Action for U.S. Appl. No. 14/629,244 mailed Sep. 29, 2015; 7 pages.
United States Patent and Trademark Office; Office Action for U.S. Appl. No. 13/603,749 mailed Jun. 26, 2014; 10 pages.
Japanese Patent Office; Office Action for Japanese App. No. 2014-547165 dated Oct. 20, 2015; 5 pages inclusive of English translation.
Chinese Patent Office; Third Office Action for Chinese App. No. 201180075576.9 mailed Nov. 18, 2015; 10 pages inclusive of English translation.

* cited by examiner

WIRELESS COMMUNICATION DEVICE USING TIME-VARIANT ANTENNA MODULE

CROSS REFERENCE TO RELATED APPLICATIONS

The present application is a national phase entry under 35 U.S.C. §371 of International Application No. PCT/US2011/065629, filed Dec. 16, 2011, entitled "WIRELESS COMMUNICATION DEVICE USING TIME-VARIANT ANTENNA MODULE", which designates the United States of America. The entire content and disclosure of which is hereby incorporated by reference in its entirety.

FIELD

Embodiments of the present disclosure generally relate to the field of wireless communication devices, and more particularly, to a wireless communication device using a time-variant antenna module.

BACKGROUND

Decreasing form factors in wireless communication devices coupled with a proliferation of wireless protocols by which the devices couple with various networks are challenging device design. Some designs employ a large passive antenna that is capable of covering a full radio-frequency (RF) band, even if the device ultimately operates primarily or even exclusively with only a relatively small subset of the RF band.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations are described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

According to various embodiments, the present disclosure describes a system including an antenna module, the antenna module having, an antenna, an impedance varying component coupled with the antenna and a waveform generator coupled with the antenna and the impedance varying component. The system may further include a radio module coupled with the antenna module by a signaling interface, the radio module being configured to communicate a radio-frequency (RF) signal with the antenna module and a control module coupled with the waveform generator and the radio module, the control module configured to receive status information and to control the waveform generator to vary a response of the antenna based on the status information.

In some embodiments, the radio module may include a sensor configured to sense an electrical characteristic associated with the radio module and/or the antenna module and to generate the status information based on the sensed electrical characteristic. The sensed electrical characteristic may correspond to an input impedance of the antenna module and/or an output impedance of the radio module during operation of the system.

In some embodiments, the impedance varying component is a varactor and/or the signaling interface is a coaxial cable.

In some embodiments, the system further includes a filter coupled with the waveform generator and the impedance varying component, the filter configured to pass a control waveform to the impedance varying component and to block a radio frequency signal from the waveform generator.

In some embodiments, the signaling interface is a first signaling interface and the antenna module includes a second signaling interface to couple the filter to the impedance varying component. In some embodiments, the first signaling interface is a first coaxial cable and the second signaling interface is a second coaxial cable.

In some embodiments, the system may further include a circuit board having the radio module and the control module disposed thereon, wherein the antenna module is disposed separately from the circuit board.

In some embodiments, the circuit board is a first circuit board and the system further includes a second circuit board coupled with the first circuit board and having the radio module disposed thereon.

The present disclosure may further describe a system including a circuit board, a radio module disposed on the circuit board, an antenna module disposed separately from the circuit board, the antenna module including an antenna and an impedance varying component, the antenna module configured to communicate a radio frequency (RF) signal with the radio module via a signaling interface, a waveform generator disposed on the circuit board and coupled with the signaling interface, and a control module coupled with the radio module and the waveform generator and configured to control the waveform generator to provide a control waveform on the signaling interface to vary a response of the antenna.

In some embodiments, the radio module and the waveform generator are monolithically integrated in a common die.

In some embodiments, the system may further include a filter coupled with the waveform generator and configured to provide the control waveform to the signaling interface, wherein the sensor is monolithically integrated in the common die with the radio module and the waveform generator.

In some embodiments, the filter is coupled with the signaling interface through an RF transmission line of the radio module.

In some embodiments, the system may further include a filter coupled with the waveform generator and the impedance varying component and configured to pass the control waveform to the impedance varying component and block the RF signal from the waveform generator.

In some embodiments, the circuit board is a first circuit board and the system further includes a second circuit board disposed on the first circuit board and having the radio module, the waveform generator, and the filter disposed thereon.

In some embodiments, the filter is directly coupled with the signaling interface. In some embodiments, the radio module further includes a sensor coupled with one or more components of the radio module and/or antenna module and configured to provide status information to the control module based on sensed electrical characteristics.

In some embodiments, the sensor is configured to sense electrical characteristics at one more locations within the radio module and to provide radio status information based on the sensed electrical characteristics. In some embodiments, the control module is configured to control the waveform generator based on pre-programmed tuning parameters. In some embodiments, the control module is configured to control the waveform generator based on operational parameters.

The present disclosure may further describe one or more computer readable media having instructions that, when executed cause a transceiver to sense an electrical characteristic associated with a radio module and/or a time-variant antenna module, compare sensed electrical characteristics to predetermined desired electrical characteristics, and adjust, based on said comparing, a control waveform to vary characteristic resonant frequencies of an antenna of the time-variant antenna module.

In some embodiments, the instructions, when executed further cause the transceiver to determine that an absolute value of a difference between the sensed electrical characteristics and the desired electrical characteristics is greater than a predetermined value and adjust the control waveform based on said determination. In some embodiments, the electrical characteristic is an output impedance of the radio module and/or an input impedance of the antenna module.

Figure 1:
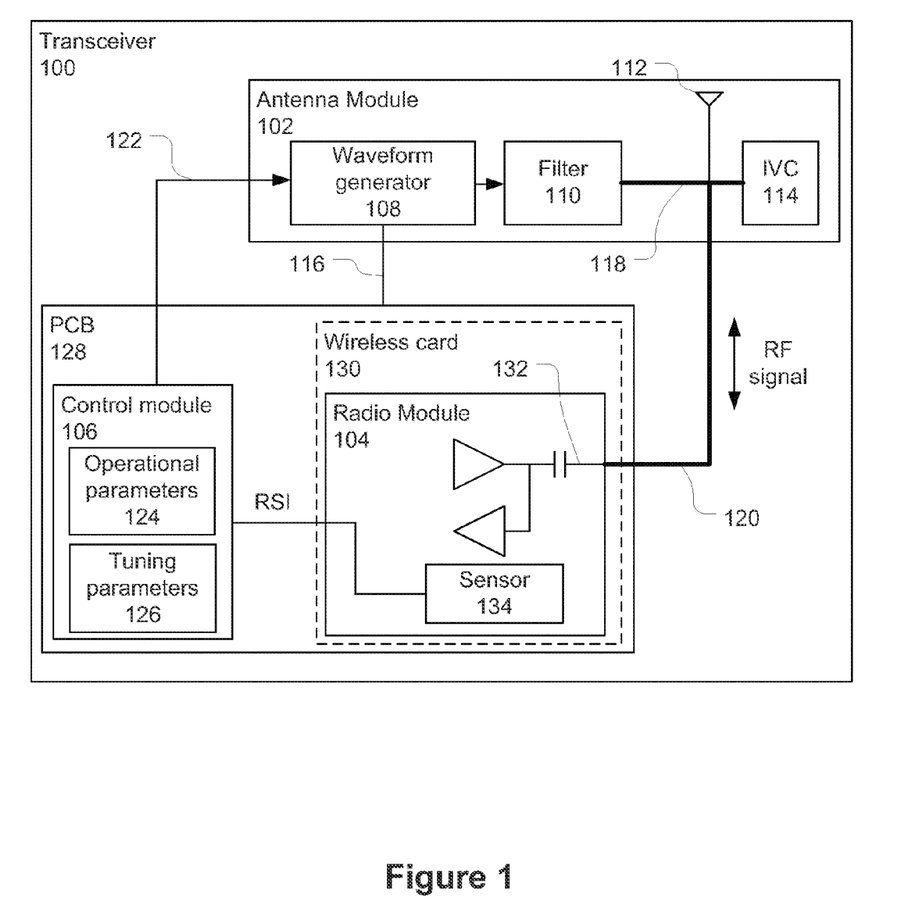
FIG. 1 illustrates a transceiver in accordance with some embodiments.

FIG. 1 illustrates a transceiver 100 in accordance with some embodiments. The transceiver 100 may include an antenna module 102, a radio module 104 and a control module 106 coupled with one another at least as shown. The antenna module 102 may include a waveform generator 108, a filter 110, an antenna 112, and an impedance-varying component (IVC) 114. The antenna module 102 may be a time-variant antenna module that is capable of dynamically changing a resonance response of the antenna 112, hereinafter "antenna response."

The waveform generator 108 may generate one of a plurality of control waveforms that is provided to the filter 110. The filter 110 may pass a control waveform to the IVC 114 and block radio frequency (RF) signals from the waveform generator 108. The control waveform may be in the low megahertz range, while RF signal may be in the gigahertz range, thereby facilitating filtering operations of the filter 110.

The filter 110 may be coupled with IVC 114 by a signaling interface 118 to facilitate transmission of the control waveform. The signaling interface 118 may be a coaxial cable. The control waveform is excited to the antenna 112 through the IVC 114, which may be a varactor, for example. The voltages in the control waveform may vary the impedance of the IVC 114 and result in controlled variations of the characteristic resonant frequencies of the antenna 112. A modulation frequency of the control waveforms may be greater than twice the radio signal bandwidth to meet Nyquist sampling theorem for transmitting/receiving data without data contamination.

By varying the impedance of the IVC 114, the antenna response may be reconfigured to change a resonating frequency from a first band to a second band, from one band to multi-bands, and/or from a relatively narrowband to a relatively wideband. In various embodiments, a control waveform that is a square waveform may result in a dual-band antenna response, a control waveform that is a tri-step waveform may result in a tri-band antenna response, and a control waveform that is a sawtooth waveform may result in a wideband antenna response. Varying amplitude, frequency, and/or shape of the control waveform may result in other antenna responses without changing the antenna structure.

In addition to or as an alternative of band reconfiguration of the antenna response, as described above, varying of the impedance of the IVC 114 may improve antenna efficiency through impedance matching at the operating frequency.

The radio module 104 may be coupled with antenna 112 by a signaling interface 120 for transmission of a data-carrying signal such as an RF signal. The signaling interface 120 may be a coaxial cable. The radio module 104 may communicate, e.g., transmit/receive, the RF signal with the antenna module 102 by way of the signaling interface 120. The radio module 104 may include a transmission line 132 to communicate the RF signal with the signaling interface 120.

The control module 106 may be coupled with the antenna module 102 and provide, e.g., digital control signals to the waveform generator 108 by a control interface 122. The control module 106 may control the waveform generator 108 based on operational parameters 124 and/or tuning parameters 126.

Operational parameters 124, in some embodiments, may be parameters that relate to an operational mode of the transceiver 100. For example, in some embodiments, the transceiver 100 may switch between operating in a first operational mode in accordance with a first protocol (e.g. digital television (DTV), long-term evolution (LTE), WiFi, WiMAX, Bluetooth, global positioning satellite (GPS), near field communication (NFC), etc.) that uses a first antenna response, to operating in a second operational mode in accordance with a second protocol that uses a second antenna response. Different operational modes may also be used within one protocol. For example, the transceiver 100 may use a first antenna response for uplink communications and a second antenna response for downlink communications. Other operational parameters may be additionally/alternatively used in other embodiments.

The capability of dynamically reconfiguring the antenna response may allow for the antenna 112 to be smaller than a conventional antenna and/or may allow for the use of less antennas altogether. In some embodiments, the antenna 112 may be smaller than a conventional antenna by 30% or more.

Tuning parameters 126, in some embodiments, may be parameters that relate to the operating environment of the transceiver 100 or its components. For example, in some embodiments the position of a user's hand holding a mobile device hosting the transceiver 100 may detune an antenna response. In another example, an antenna response may change from an expected antenna response during installation and placement of the antenna 112 in the mobile device. In either example, the control module 106 may control the waveform generator 108 in a manner to apply control waveforms with appropriate amplitude, shape, and/or frequency to tune the antenna response to compensate for undesired changes. In such a manner, the antenna response may be adapted to a particular environment in which the antenna 112 is operating.

In various embodiments, the control module 106 may be pre-programmed with the tuning parameters, e.g., at assembly of the mobile device, and/or may receive the tuning parameters dynamically through operation. For example, in one embodiment the radio module 104 may include a sensor 134 to sense changes in electrical characteristics associated with components of the radio module 104 and/or antenna module 102. In various embodiments, the sensor 134 may include one or more sensors that are placed in additional/alternative locations in the transceiver 100, e.g., in the antenna module 102. In various embodiments, the sensor 134 may sense changes in an output impedance of the radio module 104, an input impedance of the antenna module 102, a signal power on transmission line 132, etc. These sensed changes may indicate that an antenna response has become detuned. The sensor 134 may generate status information, e.g., radio status information (RSI), based on these sensed electrical characteristics and feed the RSI back to the control module 106. The control module 106 may then adjust the antenna response accordingly.

In some embodiments, the radio module 104 and the control module 106 may be disposed on a common circuit board, e.g., printed circuit board (PCB) 128. The radio module 104 may be directly coupled with the PCB 128 or coupled with the PCB 128 through another circuit board, e.g., wireless card 130. The antenna module 102 may be disposed separately from the PCB 128. The waveform generator 108 may receive power from the PCB 128 by a power interface 116.

In some embodiments, the control module 106 may be implemented on the wireless card 130 or in the radio module 104.

Figure 2:
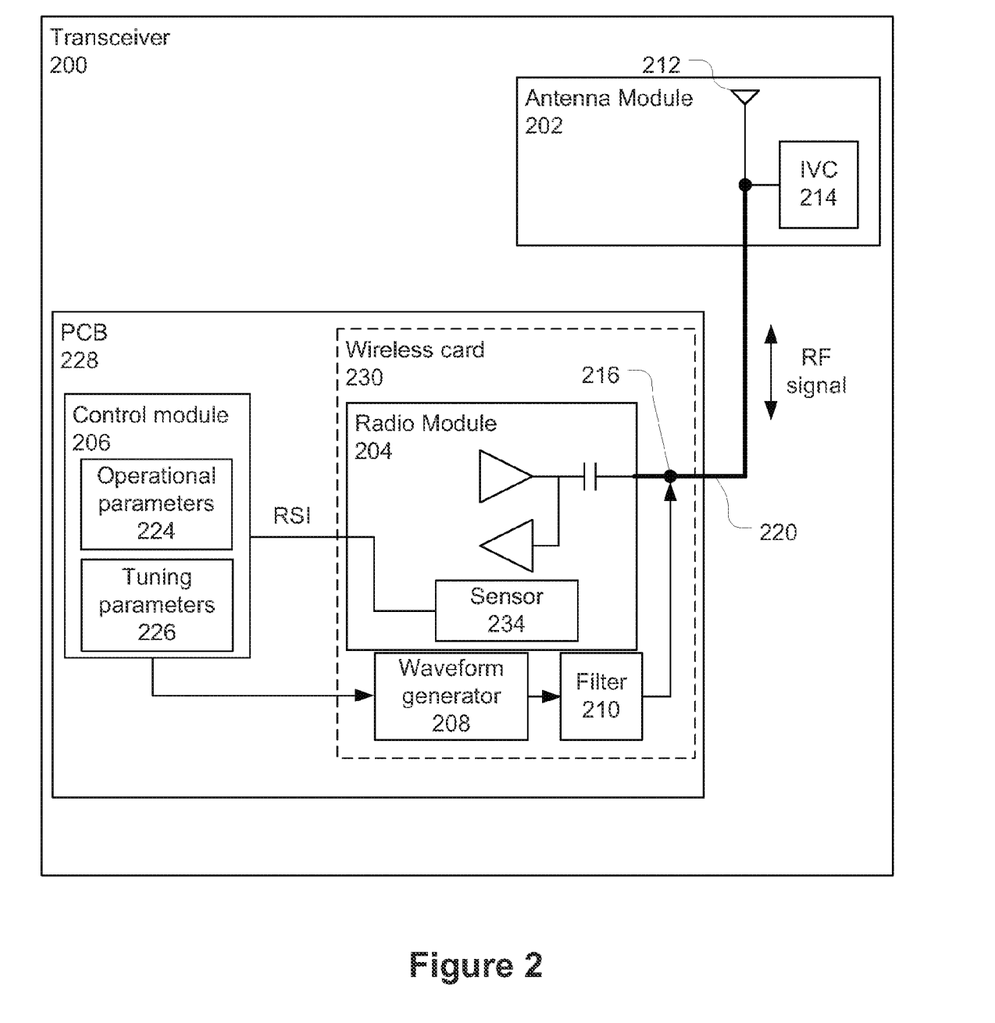
FIG. 2 illustrates a transceiver in accordance with some embodiments.

FIG. 2 illustrates a transceiver 200 in accordance with some embodiments. The transceiver 200 and its components may operate similar to transceiver 100 and its components except as otherwise noted.

The transceiver 200 may include an antenna module 202, a radio module 204 and a control module 206 coupled with one another at least as shown.

The antenna module 202 may include an antenna 212 and an IVC 214. However, in this embodiment, a waveform generator 208 and a filter 210 may be disposed on the PCB 228, either directly or by being coupled with a wireless card 230 that is coupled with the PCB 228, rather than being on the antenna module 202.

The radio module 204 may be coupled with the antenna module 202 by signaling interface 220. The filter 210 may be directly coupled with the signaling interface 220 at node 216 to provide the control waveform. Node 216 may be on the wireless card 230 or on PCB 228. Coupling the filter 210 to the signaling interface 220 at node 216, may reduce the number of signaling and power interfaces as compared to the embodiment shown in FIG. 1.

Figure 3:
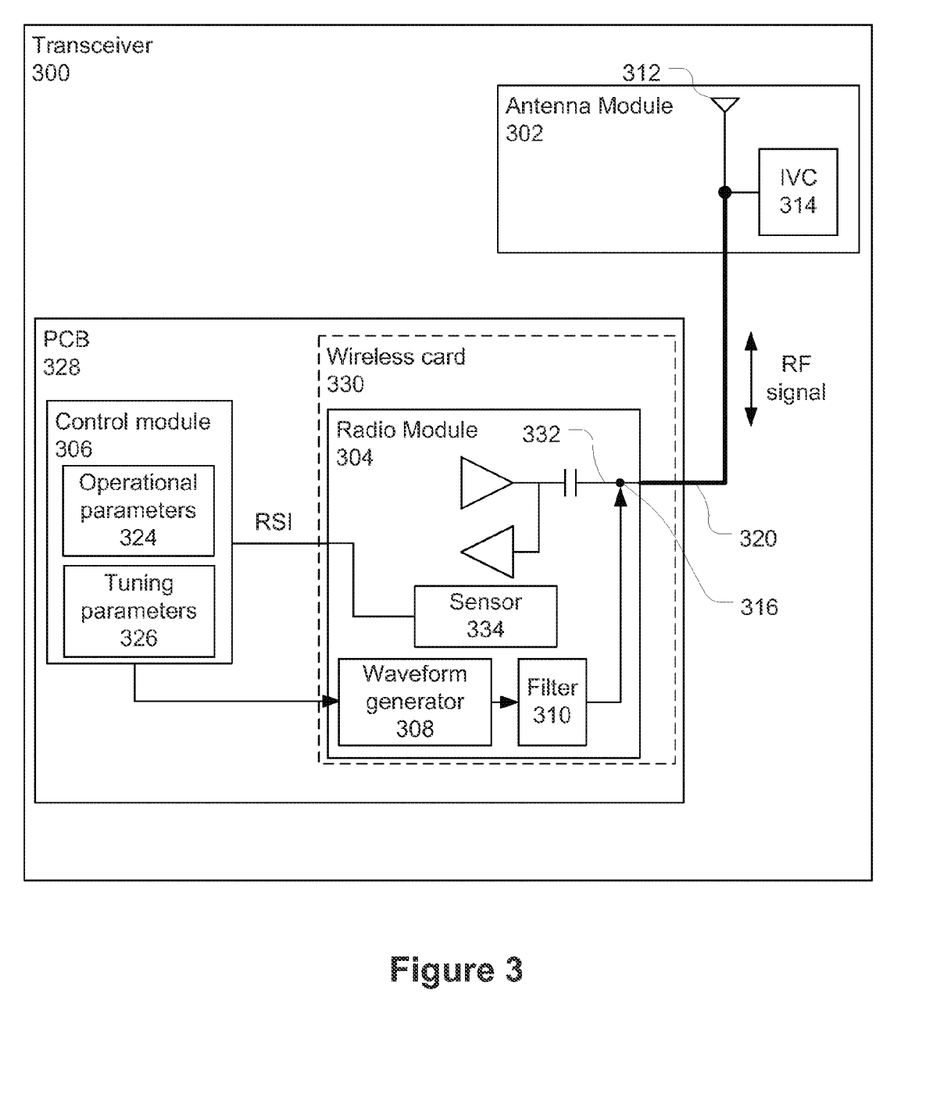
FIG. 3 illustrates a transceiver in accordance with some embodiments.

FIG. 3 illustrates a transceiver 300 in accordance with some embodiments. The transceiver 300 and its components may operate similar to transceiver 200 and its components except as otherwise noted.

The transceiver 300 may include an antenna module 302, a radio module 304 and a control module 306 coupled with one another at least as shown.

The antenna module 302 may include an antenna 312 and an IVC 314. However, in this embodiment, a waveform generator 308 and a filter 310 may be disposed in the radio module 304. Thus, the waveform generator 308 and the filter 310 may be monolithically integrated with the radio module components, e.g., power amplifiers, low noise amplifiers, matching networks, etc.

The filter 310 may be coupled with transmission line 332 at node 316. The transmission line 332 may, in turn, be coupled with signaling interface 320. Similar to transceiver 200, transceiver 300 may reduce the number of signaling interface as compared to the embodiment shown in FIG. 1.

Figure 4:
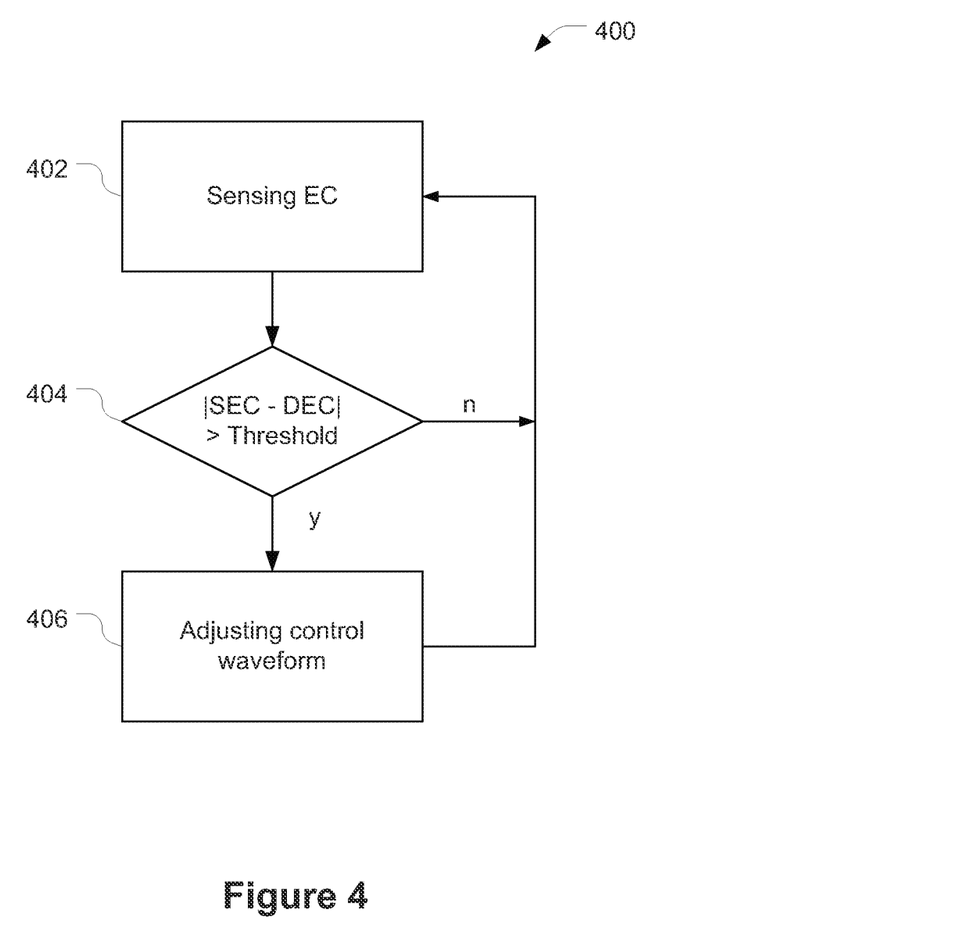
FIG. 4 is a flowchart depicting a tuning operation in accordance with some embodiments.

FIG. 4 is a flowchart depicting a tuning operation 400 in accordance with some embodiments. At block 402, the tuning operation 400 may include sensing, e.g., with sensor 134, 234, or 334, electrical characteristics (EC) at one or more locations within a radio module. For example, the EC may be sensed at a radio module's transmission line, which is coupled with a signaling interface, at a low noise amplifier, at a power amplifier, etc. In various embodiments, various electrical characteristics may be sensed including, but not limited to, signal power and output impedance of the radio module during operation. In other embodiments, EC may be sensed at other locations and may be, e.g., an input impedance of an antenna module.

At block 404, the tuning operation 400 may include comparing sensed electrical characteristics (SEC) to predetermined desired electrical characteristics (DEC). The DEC may be a range of permissible or expected values of the particular electrical characteristics. The comparing of block 404 may include determining whether an absolute value of a difference between SEC and DEC is greater than a predetermined threshold value. The predetermined threshold value may correspond with the range of permissible or expected values.

If, at block 404, it is determined that the difference between the SEC and the DEC is greater than the predetermined threshold value, the tuning operation 400 may advance to block 406.

At block 406, the tuning operation 400 may include adjusting a control waveform. The adjusting of the control waveform may occur by a control module, e.g., control module 106, 206, or 306, providing appropriate digital control signals to a waveform generator, e.g., waveform generator 108, 208, or 308. The tuning operation may then loop back to sensing of the EC at block 402.

If, at block 404, it is determined that the difference between the SEC and the DEC is less than or equal to the predetermined threshold value, the tuning operation 400 may loop back to sensing of the EC at block 402.

Figure 5:
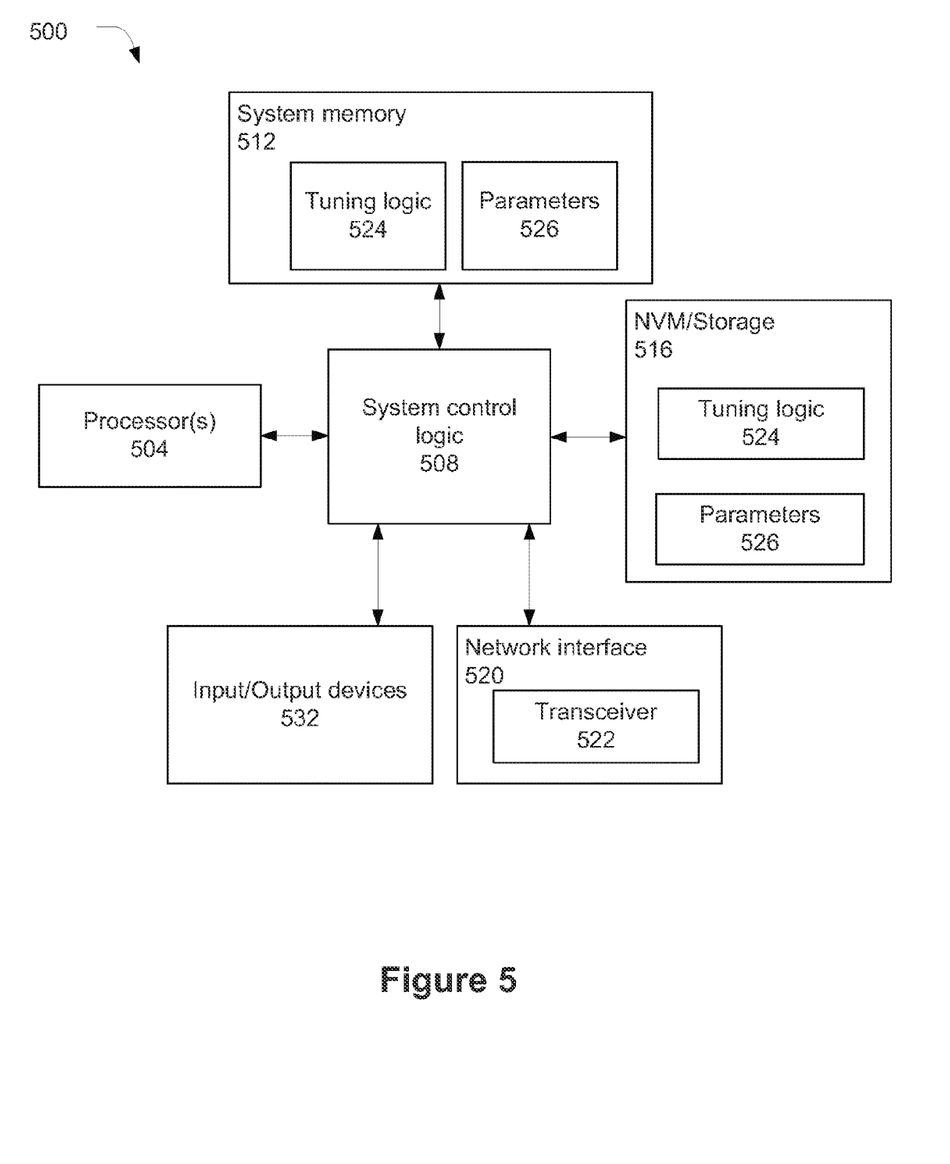
FIG. 5 illustrates a system that may be used to practice various embodiments described herein.

The transceivers described herein may be implemented into a system using any suitable hardware and/or software to configure as desired. FIG. 5 illustrates, for one embodiment, an example system 500 comprising one or more processor(s) 504, system control logic 508 coupled with at least one of the processor(s) 504, system memory 512 coupled with system control logic 508, non-volatile memory (NVM)/storage 516 coupled with system control logic 508, and a network interface 520 coupled with system control logic 508.

The processor(s) 504 may include one or more single-core or multi-core processors. The processor(s) 504 may include any combination of general-purpose processors and dedicated processors (e.g., graphics processors, application processors, etc.).

System control logic 508 for one embodiment may include any suitable interface controllers to provide for any suitable interface to at least one of the processor(s) 504 and/or to any suitable device or component in communication with system control logic 508.

System control logic 508 for one embodiment may include one or more memory controller(s) to provide an interface to system memory 512. System memory 512 may be used to load and store data and/or instructions, for example, for system 500. System memory 512 for one embodiment may include any suitable volatile memory, such as suitable dynamic random access memory (DRAM), for example.

NVM/storage 516 may include one or more tangible, non-transitory computer-readable media used to store data and/or instructions, for example. NVM/storage 516 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 516 may include a storage resource physically part of a device on which the system 500 is installed or it may be accessible by, but not necessarily a part of, the device. For example, the NVM/storage 516 may be accessed over a network via the network interface 520.

System memory 512 and NVM/storage 516 may respectively include, in particular, temporal and persistent copies of tuning logic 524 and parameters 526, e.g., operational and tuning parameters. The tuning logic 524 may include instructions that when executed by at least one of the processor(s) 504 result in the system 500 performing tuning operations described herein. In some embodiments, the tuning logic 524, or hardware, firmware, and/or software components thereof, may additionally/alternatively be located in the system control logic 508, the network interface 520, and/or the processor(s) 504.

Network interface 520 may have a transceiver 522 to provide a radio interface for system 500 to communicate over one or more network(s) and/or with any other suitable device. The transceiver 522 may be similar to, and substantially interchangeable with, transceivers 100, 200, and/or 300. In various embodiments, the transceiver 522 may be integrated with other components of system 500. For example, the transceiver 522 may include a processor of the processor(s) 504, memory of the system memory 512, and NVM/Storage of NVM/Storage 516. Network interface 520 may include any suitable hardware and/or firmware. Network interface 520 may include a plurality of antennas to provide a MIMO radio interface. Network interface 520 for one embodiment may include, for example, a network adapter, a wireless network adapter, a telephone modem, and/or a wireless modem.

For one embodiment, at least one of the processor(s) 504 may be packaged together with logic for one or more controller(s) of system control logic 508. For one embodiment, at least one of the processor(s) 504 may be packaged together with logic for one or more controllers of system control logic 508 to form a System in Package (SiP). For one embodiment, at least one of the processor(s) 504 may be integrated on the same die with logic for one or more controller(s) of system control logic 508. For one embodiment, at least one of the processor(s) 504 may be integrated on the same die with logic for one or more controller(s) of system control logic 508 to form a System on Chip (SoC).

The system 500 may further include input/output (I/O) devices 532. The I/O devices 532 may include user interfaces designed to enable user interaction with the system 500, peripheral component interfaces designed to enable peripheral component interaction with the system 500, and/or sensors designed to determine environmental conditions and/or location information related to the system 500.

In various embodiments, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 520 to communicate with components of a positioning network, e.g., a global positioning system (GPS) satellite.

In various embodiments, the system 500 may be a mobile computing device such as, but not limited to, a laptop computing device, a tablet computing device, a netbook, a smartphone, etc. In various embodiments, system 500 may have more or less components, and/or different architectures.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A system comprising:
   antenna circuitry having:
     an antenna;
     an impedance varying component coupled with the antenna; and
     a waveform generator coupled with the antenna and the impedance varying component;
   radio circuitry coupled with the antenna circuitry by a signaling interface, the radio circuitry to communicate a radio-frequency (RF) signal with the antenna circuitry;
   control circuitry coupled with the waveform generator and the radio circuitry, the control circuitry to receive status information and to control the waveform generator to vary a response of the antenna based on the status information; and
   a filter coupled with the waveform generator and the impedance varying component, the filter to pass a control waveform to the impedance varying component and to block a radio frequency signal from the waveform generator.

2. The system of claim 1, wherein the radio circuitry comprises:

a sensor to sense an electrical characteristic associated with the radio circuitry and/or the antenna circuitry and to generate the status information based on the sensed electrical characteristic.

3. The system of claim 2, wherein the sensed electrical characteristic corresponds to an input impedance of the antenna circuitry and/or an output impedance of the radio circuitry during operation of the system.

4. The system of claim 1, wherein the impedance varying component is a varactor.

5. The system of claim 1, wherein the signaling interface is a coaxial cable.

6. The system of claim 1, wherein the signaling interface is a first signaling interface and the antenna circuitry includes a second signaling interface to couple the filter to the impedance varying component.

7. The system of claim 6, wherein the first signaling interface is a first coaxial cable and the second signaling interface is a second coaxial cable.

8. The system of claim 1, further comprising:
a circuit board having the radio circuitry and the control circuitry disposed thereon, wherein the antenna circuitry is disposed separately from the circuit board.

9. The system of claim 8, wherein the circuit board is a first circuit board and the system further comprises:
a second circuit board coupled with the first circuit board and having the radio circuitry disposed thereon.

10. A system comprising:
a circuit board;
radio circuitry disposed on the circuit board;
antenna circuitry disposed separately from the circuit board, the antenna circuitry including an antenna and an impedance varying component, the antenna circuitry communicate a radio frequency (RF) signal with the radio circuitry via a signaling interface;
a waveform generator disposed on the circuit board and coupled with the signaling interface;
control circuitry coupled with the radio circuitry and the waveform generator, the control circuitry control the waveform generator to provide a control waveform on the signaling interface to vary a response of the antenna; and
a filter coupled with the waveform generator and the impedance varying component, the filter to pass the control waveform to the impedance varying component and block the RF signal from the waveform generator.

11. The system of claim 10, wherein the radio circuitry and the waveform generator are monolithically integrated in a common die.

12. The system of claim 11, wherein the filter is coupled with the waveform generator and is to provide the control waveform to the signaling interface.

13. The system of claim 12, wherein the filter is coupled with the signaling interface through an RF transmission line of the radio circuitry.

14. The system of claim 10, wherein the circuit board is a first circuit board and the system further comprises:
a second circuit board disposed on the first circuit board and having the radio circuitry, the waveform generator, and the filter disposed thereon.

15. The system of claim 14, wherein the filter is directly coupled with the signaling interface.

16. The system of claim 10, wherein the radio circuitry further comprises:
a sensor coupled with one or more components of the radio circuitry and/or antenna circuitry, the sensor to provide status information to the control circuitry based on sensed electrical characteristics.

17. The system of claim 16, wherein the sensor is to sense electrical characteristics at one more locations within the radio circuitry and to provide radio status information based on the sensed electrical characteristics.

18. The system of claim 10, wherein the control circuitry is to control the waveform generator based on pre-programmed tuning parameters.

19. The system of claim 10, wherein the control circuitry is to control the waveform generator based on operational parameters.

\* \* \* \* \*